United States Patent [19]

Garney

[11] Patent Number: 5,854,905

[45] Date of Patent: *Dec. 29, 1998

[54] EXTENSIBLE BIOS FOR BOOT SUPPORT OF DEVICES ON MULTIPLE HIERARCHICAL BUSES

[75] Inventor: John I. Garney, Aloha, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 707,333

[22] Filed: Sep. 3, 1996

[51] Int. Cl.$^6$ ............................................. G06F 9/24
[52] U.S. Cl. ........................................ 395/284; 395/652
[58] Field of Search ............................ 395/281, 652, 395/200.51, 200.52, 651, 284, 653

[56] References Cited

U.S. PATENT DOCUMENTS

| | | | |
|---|---|---|---|
| 5,008,816 | 4/1991 | Fogg, Jr. et al. | 711/200 |
| 5,448,045 | 9/1995 | Clark | 235/382 |
| 5,465,357 | 11/1995 | Bealkowski et al. | 395/700 |
| 5,546,585 | 8/1996 | Soga | 395/700 |
| 5,680,556 | 10/1997 | Begun et al. | 395/311 |
| 5,680,597 | 10/1997 | Chang | 395/200.01 |
| 5,689,726 | 11/1997 | Lin | 395/830 |

*Primary Examiner*—Ayaz R. Sheikh
*Assistant Examiner*—Paul R. Myers
*Attorney, Agent, or Firm*—Blakely, Sokoloff, Taylor & Zafman LLP

[57] ABSTRACT

An extensible BIOS for a computer system to manage boot-up of an arbitrary number of devices connected over an arbitrary number of buses and bridges of varying type. The extensible BIOS identifies all bridges or buses connected to the system and then initializes each and every bus or bridge. The extensible BIOS identifies boot devices as resident on all initialized bridges and buses, and then detects and initializes drivers on the identified boot devices. According to the selection and priority of boot, boot-up then commences utilizing the boot devices. Between one instance of computer reset or boot-up and the next, the extensible BIOS provides that the hierarchy of buses and bridges and boot devices connected to them may be altered while still recognizing all boot relevant devices, buses and bridges regardless of the nature of the alteration.

15 Claims, 9 Drawing Sheets

Generic Bridge Header 1000

| Bus Specific Header | — 1100 |
| --- | --- |
| Is_Bridge Device | — 1150 |
| Is_Boot Device | — 1200 |
| ebootdevice entry point | — 1250 |
| ebridgedevice entry point | — 1300 |
| edev-bootIO entry point | — 1350 |

FIG. 7A

Partial PCI Expansion ROM Header — 2000

| Offset | Length | Description |
| --- | --- | --- |
| 0 | 4 | Data structure signature, the string "PCIR" |
| 4 | 2 | Vendor identification |
| 8 | 2 | Device Identification |
| 8 | 2 | Pointer to Vital Product DATA |
| A | 2 | PCI data structure Length |
| C | 1 | PCI data structure Revision |
| D | 3 | Class Code |
| 10 | 2 | Image Length |
| 12 | 2 | Revision Level of Code/DATA |
| 14 | 1 | Code Type |
| 15 | 1 | Indicator |
| 16 | 2 | Reserved |

FIG. 7B

Expansion ROM Signature Sequence — 3000

| Offset | Description | Value | Length |
| --- | --- | --- | --- |
| 00h | Expansion ROM identification byte #0 | 55h | 1 Byte |
| 01h | Expansion ROM identification byte #1 | AAh | 1 Byte |
| 02h-17h | Reserved (processor architecture unique data) | xx | 16h Bytes |
| 18h-19h | Pointer to PCI data structure | xx | 2h Bytes |

EXTENSIBLE BIOS FOR BOOT SUPPORT OF DEVICES ON MULTIPLE HIERARCHICAL BUSES

BACKGROUND OF THE INVENTION

1. Field of the Invention

The present invention relates generally to the managing of boot devices in computer systems, and specifically to extending BIOS to manage boot-up from an unlimited variety of boot devices that can appear dynamically within a computer system.

2. Description of Related Art

In typical personal computer (PC) systems, the management of boot devices and the sequence of booting is controlled through fixed code contained within Basic Input/Output System (BIOS) Read-Only Memory (ROM). The BIOS ROM predetermines how devices can be connected in the particular computer system and which types of devices can be supported by the BIOS. Some additional expansion BIOS ROM code can be introduced into a computer system on an add-in card, but only for a limited set of boot devices: i.e. local hard disks, network accessed hard disks, and video display adapters. The system BIOS ROM assumes that the boot devices are always connected to the system in the same way, i.e. via the same hardware interface(s) located at the same memory I/O address range(s). This requires that hardware interfaces for boot devices be standardized and unchanging so that the BIOS code to control these devices can support them. For example, video controllers have been required to support VGA interfaces for many years in order to allow BIOS code to continue to function even though more efficient hardware interfaces are used by operating system control software. The advent of new buses and boot devices has required either continued support of previous standardized hardware interfaces or new expansion BIOS code that understands the new hardware interfaces. The Industry Standard Architecture (ISA) bus provided a simple means of connecting boot devices and thus only required simple software to recognize and initialize its boot devices. However, computer systems have advanced to a stage where boot devices can now be connected through a variety of newer and different buses, such as Peripheral Component Interconnect (PCI) buses. Many of these new buses allow interconnection to other buses through "bridge" devices. These bridge devices must be typically programmed ahead of time to allow access to other devices connected through the bridge. The wide variety of possible hardware connections requires much more complex software in order to recognize and initialize these devices upon boot than do ISA bus connections. Providing this more complex software code in one monolithic system BIOS is typically not possible due to storage constraints of a typical BIOS which has a fixed capacity.

Further, other new buses, such as PCMCIA, allow devices to be connected and disconnected at any time by the end user of the PC and allows devices to be configured at any memory address range convenient to the software that controls them. Thus boot devices may be located at different memory and I/O address ranges from one instance of boot-up to another. Additional bridge devices that can be connected by the end user further complicate the variety of hardware connections possible. Finally, other new buses, like the Universal Serial Bus (USB), allow attaching boot devices like keyboards and mice in novel ways that cannot be supported with previous traditional BIOS code.

One attempted approach to supporting these new buses and devices involved providing only operating system support which occurs during run-time of the operating system but not providing any support through BIOS during boot-up before run-time of the operating system. However, this approach undesirably prohibits being able to use these devices as boot devices. Another attempted approach for supporting these new buses was to include additional code in the system BIOS that individually supported all possible hardware combinations. However, this approach is only reasonable when the number of possible connections is relatively small.

Thus, there is a need to simply and efficiently account for all possible boot devices connected through different type buses and in an arbitrary connection topology. To minimize and simplify the code needed in the system BIOS, there arises a need to provide a mechanism to also carry BIOS code unique to a new bus along with a bridge device for connecting the new bus or along with a boot device on the new bus.

SUMMARY

The present invention provides an extensible BIOS in a computer system that can manage booting of an arbitrarily large number of devices connected to the computer system through multiple bridges of varying types for multiple buses.

The extensible BIOS will identify a bridge that may newly appear on a computer system between particular instances of computer boots or computer resets. The extensible BIOS will also initialize the newly added bridge. The extensible BIOS also identifies what boot devices are present on a particular bus for the bridge that has been initialized. Once the boot devices have been identified, the extensible BIOS detects code for those boot devices. The extensible BIOS then initializes the driver code and according to boot device selection and priority information allows use of the selected boot devices during boot-up.

The extensible BIOS provides that the identifying of bridges, initializing of bridges, boot device identification and driver detection can be performed recursively, such that every new bridge encountered is traversed to locate more bridges and their associated boot devices if any until the entire topology is accounted for.

The extensible BIOS is composed of a number of code modules, each with their own code to carry out the operations and functions of the extensible BIOS.

DETAILED DESCRIPTION OF THE INVENTION

Figure 1:
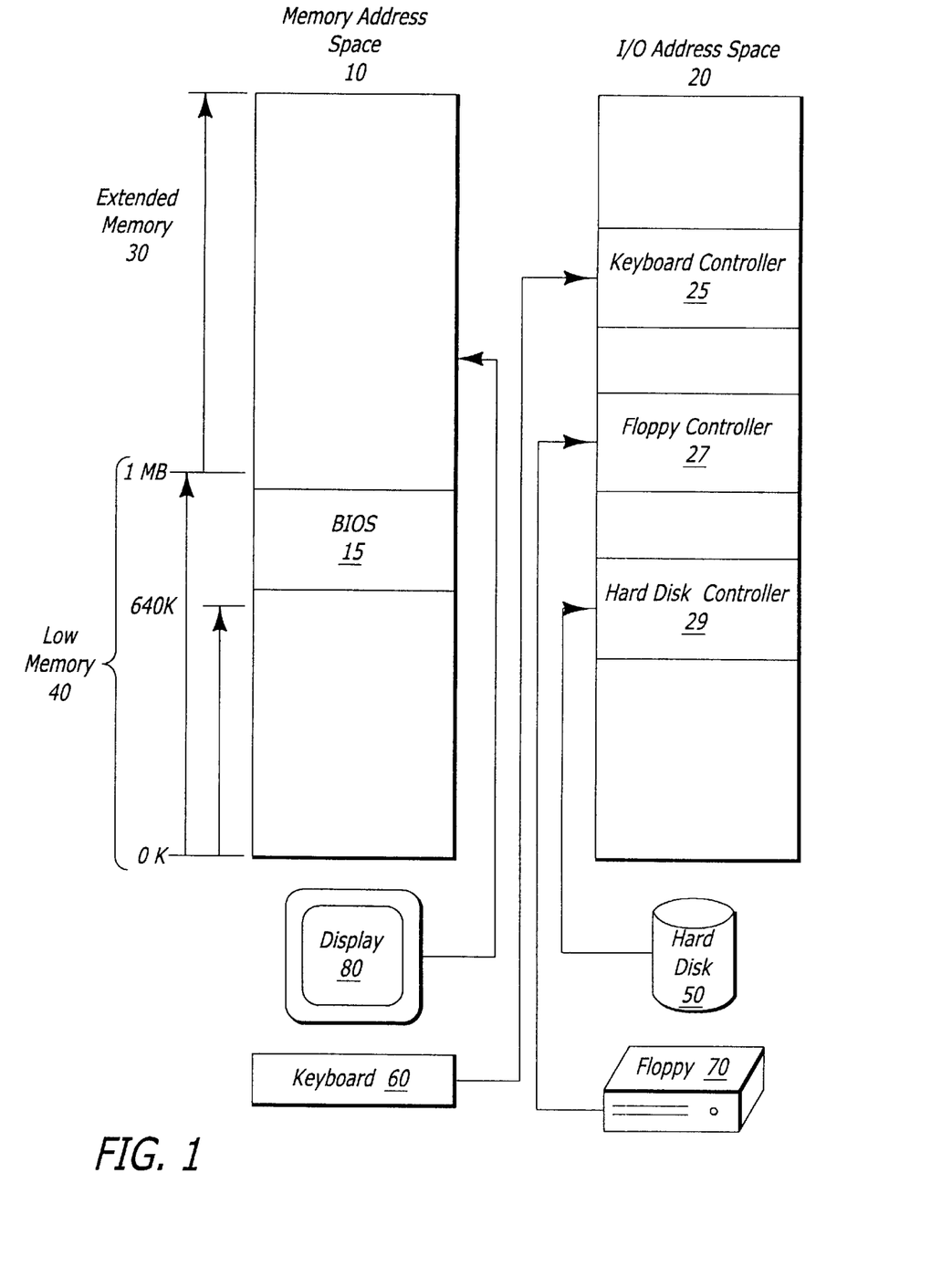
FIG. 1 shows handling of I/O devices in a typical computer system.

FIG. 1 illustrates how controllers for typical personal computer system Input/Output (I/O) devices are accessed through memory address spaces. Such a computer system usually includes a display 80, keyboard 60, a hard disk drive 50 and a floppy disk drive 70. The memory of Intel processor based computer systems is typically divided into two address spaces. There is an I/O address space 20 that contains control and status registers, and then a memory address space 10 that handles program execution and data, as well as display (video) and other controllers. The controllers keyboard controller 25, floppy controller 27 and hard disk controller 29, for the keyboard 60, floppy 70 and hard disk 50, respectively, are found in the I/O address space 20 since these devices are not memory intensive, and do not require constant updating. The display 80 has a video controller (not shown) that has some registers in I/O address space whereas video memory is located in memory address space that is usually mapped into the memory address space 10. The display 80 may be mapped either into extended memory 30, which on Intel based personal computers, is addressed above 1 Megabyte (MB) or can be mapped into low memory 40 which is addressed under 1 MB.

The Basic Input/Output System (BIOS) usually resides in the upper portion of low memory 40 between 640 kilobytes and 1 MB, but is also mapped into extended memory 30 to provide a starting memory address to be used upon system reset. Therefore, the smaller the BIOS component of a system, the greater the memory space available to code and data during operation of the system. The functions of the BIOS, relevant to boot-up, are to (1) respond to power-on/reset of the computer, (2) provide the reset vector that is mapped into the CPU's physical memory address range, (3) recognize the presence of boot devices, (4) initialize the drivers/controllers supporting those boot devices and (5) provide functionality for interaction with the user for computer setup (e.g. asking the user which device to boot from or the order of boot-up). These functions can be achieved through control software and are referred to as boot relevant functions since they must occur prior to the loading of an operating system.

Figure 2:
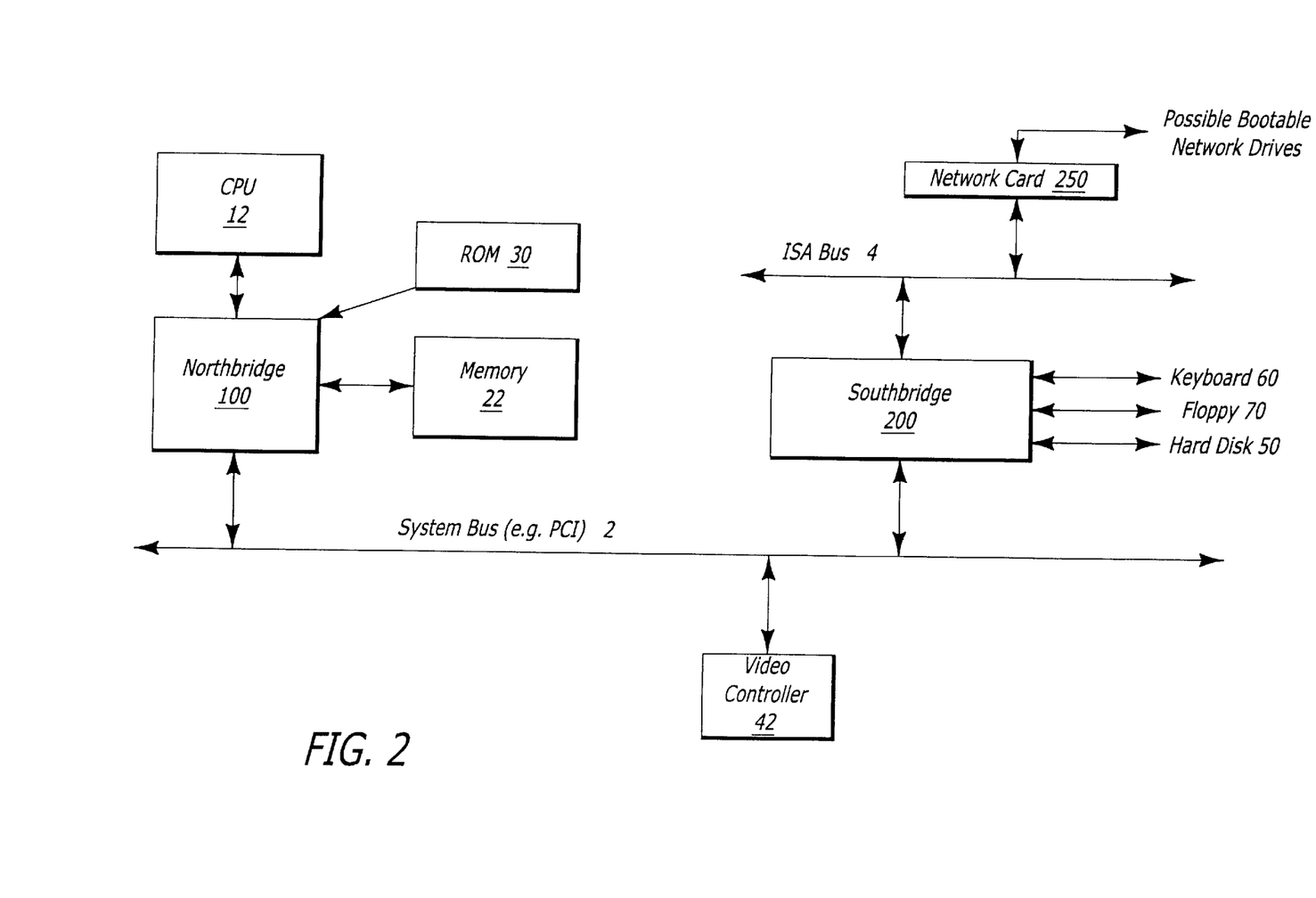
FIG. 2 shows the architecture of typical personal computer system.

FIG. 2 shows the architecture of a typical personal computer system in accordance with accepted practice. A main system bus 2, such as a Peripheral Component Interconnect (PCI) bus, connects together all the main components of a computer system. A CPU 12 of the computer system is isolated from the system bus 2 by a "Northbridge" 100 which essentially mates the CPU for read and write access to memory 22 (usually RAM). The Northbridge 100 also mates the CPU 12 for read and write access to the system bus 2 for interaction with I/O devices located elsewhere in the system.

The system also has a "Southbridge" 200 which isolates the keyboard 60, the floppy 70 and the hard disk 50 from the system bus 2 and provides a lower cost way to connect these standard devices to the system bus 2 using, for example, an Industry Standard Architecture (ISA) bus. The Southbridge 200 is also used in systems having high performance architectures (such as 32-bit addressing) to free the high performance system bus from dealing directly with add-in devices such as modems or network cards, by connecting to the lower performance (16-bit) ISA bus 4. The lower performance ISA bus 4 connects directly to the modems and network cards that are older in design and cannot take advantage of high performance 32-bit addressing. The Southbridge 200 contains controllers for the floppy 60, hard disk 50 and keyboard 70 as well as an ISA bus controller. Southbridge 200 frequently connects all the typical boot relevant devices such as hard drives and other bootable drives resident on networks through a network card 250. The video controller 40, is often a high performance add-in card connected via the system bus 2. These devices are well-known in the art and are described only for background. The present invention assumes use of existing mechanisms of BIOS for those devices on buses that are well known in the art. Mechanisms, in addition to those used previously, are required to implement a general extensible BIOS and also to provide support for new devices on new buses.

BIOS is fixed code which is permanently stored in a ROM 30 (or flash, EPROM etc.). Ordinarily, BIOS has two independent components, a system BIOS and one or more expansion BIOS such as the video BIOS (handling the display and output features of the system). The system BIOS, which is a feature of the motherboard, is most relevant to the present invention since several of the mechanisms of the system BIOS will be utilized in the extensible BIOS. The system BIOS has rudimentary mechanisms to recognize the video BIOS, for instance, or another expansion BIOS that exists on the bus. But the system BIOS is assumed to know the entire bus environment in advance of boot-time such that an expansion BIOS, if it is to be recognized, must be found on bridges and buses known to the system BIOS.

For booting, the typical system BIOS will have preinstalled, hardwired code that knows about the Southbridge and configures it to establish the well known boot device interfaces such as keyboard controller, hard disk controller, floppy disk controller. The BIOS checks for the existence of a video expansion BIOS and initializes it if present. A memory check is then performed with the results thereof displayed on the video display. The system BIOS then checks that the hard disk 50 and floppy disk 70 controllers are present at their pre-specified addresses and initializes their drivers. A search for additional expansion BIOS code is then performed. When the network card 250, which connects out to network disk drives, is introduced into a system, the network card 250 will typically be pre-packaged with an expansion BIOS that contains the network boot code. The network boot code is not typically included in the system BIOS. On personal computers of recent vintage, the boot device driver code has been limited to support for a keyboard, a hard disk or floppy disk that is already connected into the PC or that is a permanent feature of the computer. Thus, the BIOS knows well in advance what devices it is looking for, how in the system topology they are connected (for example, on an ISA bus) and what the order of boot-up will be. On a PC, the system BIOS usually provides a way for the user to change the boot drive from the hard disk back to the floppy and vice versa. However, the disk drives chosen must be known to the BIOS prior to the user changing the order, and consequently, prior to next boot instance. If the BIOS had to contain code that anticipated all of the various boot devices that could exist at any given boot instance, the BIOS would be large and complex, and would have to be upgraded whenever a new type of boot device or bus is added to a personal computer. Though auto-detection of disk drive parameters is known in the art of BIOS, auto-detection only works on drives to determine drive characteristics such as the number of tracks or number of heads. Such auto-detection, as currently employed, has not been able to determine presence of novel new disks/disk controllers on potentially novel new buses within a system.

Figure 3:
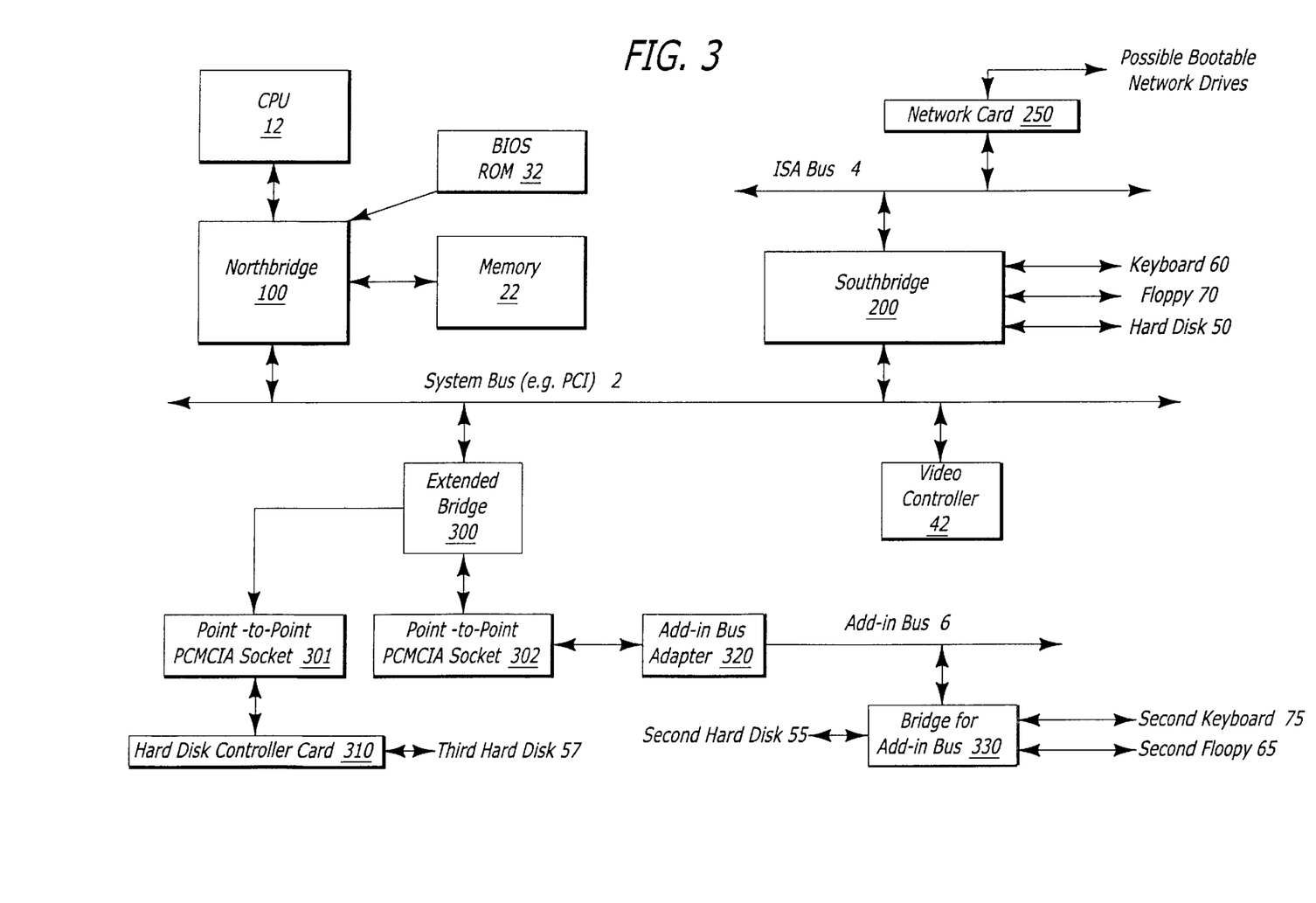
FIG. 3 shows the architecture of an extended personal computer system which would utilize an extensible BIOS.

FIG. 3 illustrates a personal computer system of the type envisioned by the present invention. The system of FIG. 3 includes all the components of the personal computer of FIG. 2. It should be understood that components common to FIGS. 2 and 3 not mentioned below operate in substantially the same way as described for FIG. 2, and thus, their description will not be repeated. An extended bridge may be resident on newer personal computers that wish to take advantage of the ability to access dynamically added or configured devices such as PCMCIA devices. For instance, PCI-bus based systems may have a PCI-to-PCI bridge that can connect a secondary PCI bus, (not shown) wherein the system BIOS of such a computer would already contain code to recognize the PCI-to-PCI bridge. The system BIOS, in most PCI systems, already contains code providing the ability to program the bridge such that previously standardized boot devices resident on the secondary PCI bus can be recognized through the bridge. However, it is possible within the PCI environment to have multiple layers of or a hierarchy of bridges that connect to a multitude of different buses. These bridges may be of a type dissimilar to a PCI bridge. Thus over a secondary PCI bus, there may be a CardBus bridge which is a bridge to a CardBus adapter, and ultimately to a CardBus. The system BIOS will not typically contain code to enable a Card Bus bridge nor to be able to recognize and configure boot devices found on a CardBus. If the BIOS were to take account of all such possible dissimilar buses or bridges, it would be impractically large and expensive. Further, when a new bus or bridge is invented, an older BIOS would not contain the code to access them. PCI bridge recognition is made economical only because the system in which it operates, as described herein, already has a PCI bus as its primary system bus. Thus, the boot devices on the PCI bus appear as standardized devices typically found at well known memory and I/O address ranges which BIOS is capable of enabling.

FIG. 3 shows an extended dissimilar bus topology. The extended bridge 300 mates two Point-to-Point PCMCIA Sockets 301 and 302 to the system bus 2. The sockets 301 and 302 can have one or more interconnects wherein cards, such as the hard disk controller card 310 and bus adapter card 320, may be mounted. The topology of the system becomes arbitrarily complex by having an add-in bus 6 that is added through the bus adapter 320. The add-in bus 6 may be a Universal Serial Bus (USB), which is quite different from a PCI bus and requires different control and status mechanisms. If add-in bus 6 is a USB then bus adapter 320 would be a USB Controller. Since a BIOS for an ordinary PCI system is ill-equipped to interact with such a rich variety of buses, bridges and boot devices, the bridges will contain BIOS support of their own to handle configuration tasks.

Several boot relevant devices are shown in FIG. 3 connected to the add-in bus 6 via a bridge for add-in bus 330. In the case where add-in bus 6 is a USB, bridge 330 could become a USB hub capable of interconnecting several additional devices. A second keyboard 75, a second hard disk 55 and second floppy disk 65 may all be connected to the system through add-in bus 330 and will need support from the system BIOS if they are to be used for boot-up. An oft-used feature of PCMCIA card sockets is the connecting, for example, of a third hard disk 57 via a hard disk controller card 310. Adding an extra hard drive with PCMCIA in this manner is very simple for a user and can happen frequently. Typically, a computer system has software to recognize the change in status of the socket, identify that a hard disk controller card has been added and provide access to the data on the hard disk. Such functionality however is frequently only provided during the run-time of the computer system, after boot-up has already occurred and the operating system is loaded, and is not a feature/function of the system BIOS.

The number of boot relevant devices in a system as shown in FIG. 3 now comes to seven. Thus a system BIOS would be larger (data/code) than a BIOS of a typical system with only 3 or so boot devices as in FIG. 2. Such a BIOS would be wasteful and unduly expensive, since these extra boot devices may not be present in the system at the next boot instance which means that a large portion of system BIOS is unused at that next instance of boot.

Further, the number of boot relevant devices that can be present in a hierarchical structure of buses and bridges is virtually unlimited; FIG. 3 exemplifies only a simple hierarchy. One skilled in the art will readily appreciate that add-in buses can contain yet more bridges to connect more buses and consequently, connect more boot devices.

Thus, an extensible BIOS is provided to extend the system BIOS itself to include code that will traverse the entire hierarchy of bridges and buses, initialize those bridges and buses, find and detect boot devices within the system and allow boot-up of any detected boot devices. First, an overview of the system BIOS as typically employed today will be described since the extensible BIOS in one embodiment extends the mechanisms of BIOS to recognize any boot relevant device however and wherever it is connected in system topology. The extensible BIOS allows system BIOS to recognize any type of bridge or new bus that may dynamically be present from one instance of boot to the next, without unduly expanding the system BIOS code in a monolithic fashion for each type of bus or bridge.

Figure 4:
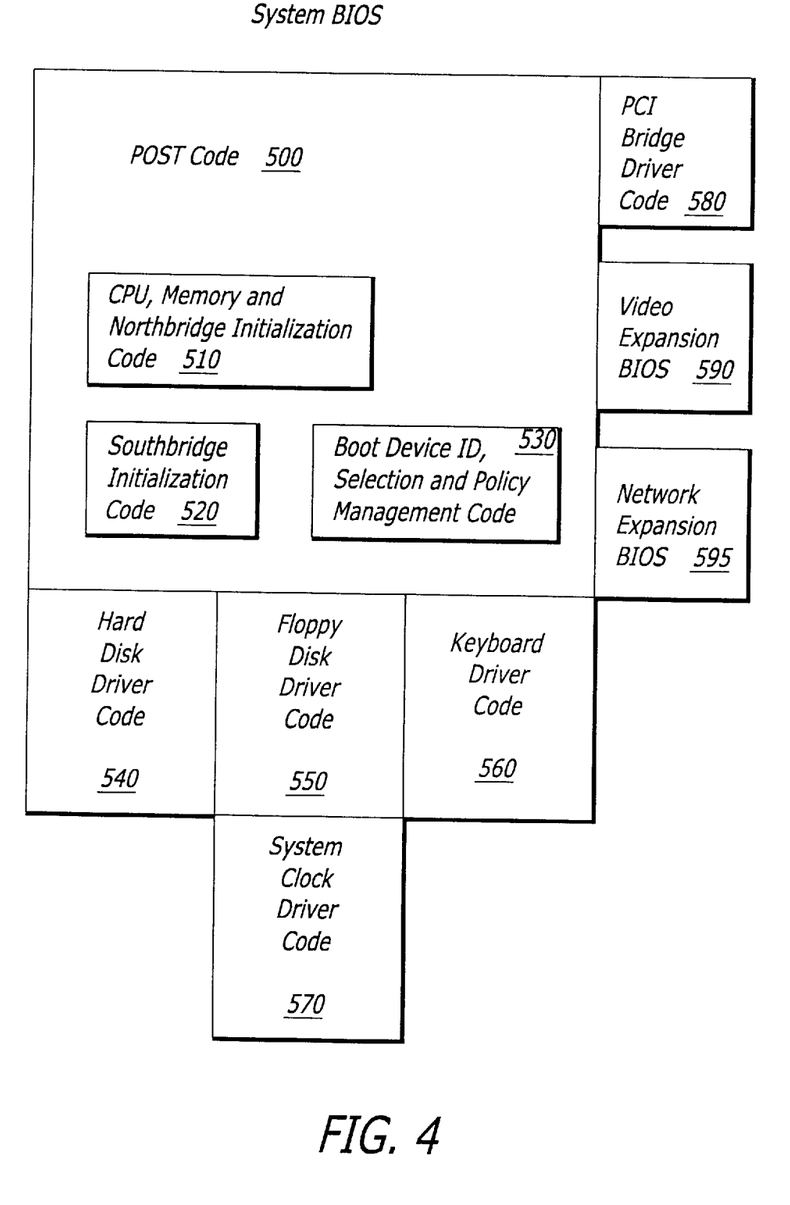
FIG. 4 shows the modules of a typical current BIOS.

Traditionally, plug-and-play mechanisms, while recognizing the existence of new devices, do so only after the operating system is running such that the new device may only be used after the operating system is loaded. Windows '95™ (a product of Microsoft Corporation), for example, eliminates the use of BIOS after the operating system takes control post boot-up by providing native drivers to replace BIOS functions. But these mechanisms are too general-purpose and do not allow pre-operating system boot-up from devices that it only later recognizes FIG. 4 illustrates the code contained within a typical BIOS. In a typical BIOS, there are a set of routines that handle events after reset and power-on of the computer but before the invocation of an operating system (such as Disk Operating System (DOS)). This set of routines that boot the computer system prior to loading the operating system is known as Power-On-Self-Test (POST). Certain devices within the computer system must always be started and in a particular order to maintain functionality and accessibility throughout the boot-up process. For instance prior to even testing the memory (RAM), there is a need to invoke the video BIOS routines so that when the memory test does run, the user can monitor its progress through a display device.

POST code 500, as shown on FIG. 4, contains several subroutines. First, the CPU is initialized. Next any initialization of the Northbridge takes place. The presence of a video expansion BIOS is detected and the video display controller is initialized. The memory is tested and initialized next with results displayed to the end user via the video display controller. This sequence of events occurs every time there is a power on, also known as a cold boot, or in some systems also upon a reset, also known as a warm boot. The CPU, memory and Northbridge initializations are grouped together as code block 510 in FIG. 4 since they are consecutively executed. There is also code 520 to initialize the Southbridge, and on PCI systems, code 580 to operate a PCI bridge. The extensible BIOS proposed in the present invention does not need to modify these sections of POST code in order to initialize the system. A keyboard will typically also be detected and its BIOS driver, keyboard driver code 560, initialized before any other expansion BIOS is detected. This allows the expansion BIOS to make use of the keyboard for user input if required. The typical BIOS will also have code that handles and performs boot device support operations, shown in FIG. 4 such as Boot Device ID, selection and policy management code 530. The focus of extensible BIOS is on (1) generic identification and initialization of bridge devices and buses, (2) generic identification and initialization of boot devices, and (3) attaching BIOS device drivers for these generic boot devices to the system BIOS for boot.

The typical system BIOS will have several embedded device drivers to handle the I/O functions of particular well-known devices such as the hard disk or floppy. FIG. 4 shows that there is hard disk driver code 540, floppy disk driver code 550, keyboard driver code 560 and system clock code 570. This list is only exemplary and not exhaustive of BIOS function so as not to obscure the invention.

Current practice for system BIOS does allow for expansion BIOS code for video controllers and hard disk controllers. FIG. 4 shows Video Expansion BIOS 590, which is a specialized BIOS "expansion" module, and is not in any way equivalent to the extensible BIOS provided for in the embodiments of the present invention. Each new device type may have its own expansion BIOS, but the current practice limits the types of boot relevant devices that can have expansion BIOS support within the system BIOS. The practice for hard disk support allows for locally connected hard disks and network connected hard disks. FIG. 4 also shows Network Expansion BIOS 595 which allows BIOS to find networked hard disks. However, those are the only expansion BIOS opportunities possible in current practice. The expansion BIOS of current practice do not accommodate novel controllers that may be located on dissimilar buses with previously non-accessible multiple boot relevant devices present. Such boot devices are non-accessible in that they are arbitrarily connected to the system and may appear on a bus which cannot be recursed into by the system BIOS for the purpose of detecting boot-up devices.

Figure 5:
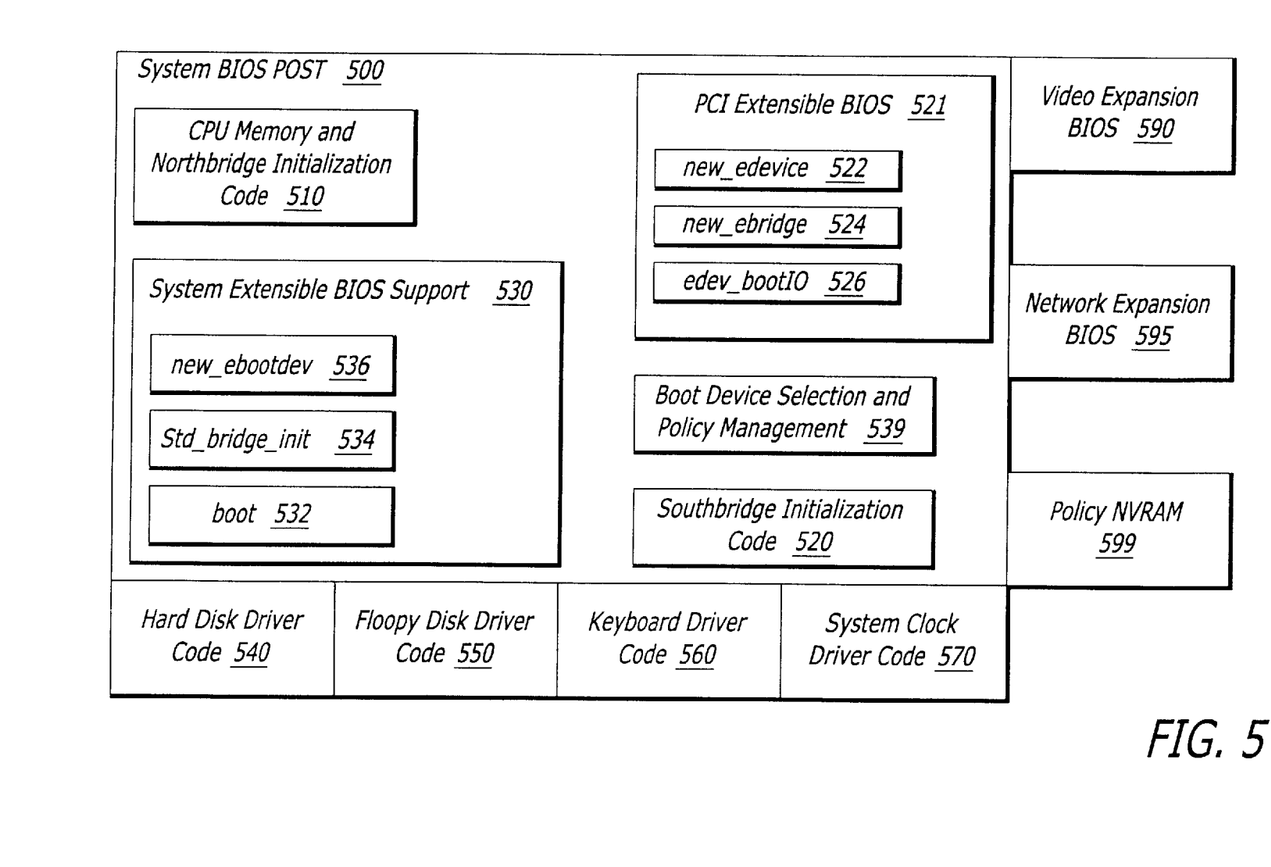
FIG. 5 shows the modules of an extensible BIOS according to one embodiment of the present invention.

FIG. 5 shows the extensible BIOS of an embodiment of the present invention. The CPU, Northbridge and Memory Initialization and Southbridge Initialization codes 510 and 520, respectively, described with FIG. 4 operate in the same way as with the typical BIOS and will not be described again. The present invention provides for additions/modifications to the system BIOS to support the extensible BIOS. These additions are contained in system extensible BIOS support 530 and a PCI extensible BIOS 521.

System extensible BIOS support 530 includes three procedures or code "modules"—new_ebootdev 536, Std_bridge_init 534 and boot 532. These modules are shown in Appendix 1 and are described below. The module new_ebootdev 536 is called when a new extensible boot device is identified. This procedure allows the system BIOS to determine via its boot device policy whether a boot device will be used for the current instance of boot-up. The module new_ebootdev 536 is passed three parameters: entry, type and a pointer to boot device parameters. The "entry" parameter contains the memory address for an entry point for the new boot device's I/O functions which are used to perform any I/O with the new boot device. The type parameter contains a value indicating the type of the new boot device, e.g., 0=bridge, 1=hard disk, 2=floppy disk, 3=keyboard, 4=mouse, 5=network disk, and 6=video display controller.

The pointer to device parameters ("device params") contain a memory address for a block of memory filled with data specifically used by the new boot device's boot I/O procedure. The "device params" memory address is passed to the boot I/O entry point for each I/O request. The device params data is used to allow the boot I/O procedure to manipulate the boot device and distinguish it from other boot devices on the same or different buses/bridges. Returning the "type" parameter of the new boot device allows the boot device policy (not shown) to determine whether to use the new boot device for the current instance of boot-up. If the boot device will be used, the system BIOS saves the entry point and "device params" for use during boot I/O requests for the boot device.

The module Std_bridge_init 534 is called internally by system BIOS to initialize a standard bridge, such as a PCI bridge as a starting point in recursing the bus and boot device topology. The module Std_bridge_init 534 initializes any PCI bridges known to the system BIOS. Instead of using monolithic code contained within the system BIOS, this embodiment shows that the same extensible BIOS apparatus and methodology is used. In particular, the module new_ebridge 524 is called for the PCI bridge. The module new_ebridge 524, when executed, recursively traverses the system topology (i.e. any and all buses, bridges and devices that are connected).

The module boot 532 is a modification of the normal BIOS boot code module and allows extensible BIOS boot I/O procedures to be used instead of internal system BIOS I/O routines. These extensible BIOS boot I/O procedures must be used for any extensible BIOS boot devices selected by the system BIOS policy for this instance of system boot-up. Internal system BIOS I/O routines can only manipulate standardized boot device hardware such as an Integrated Drive Electronics (IDE) controller. The extensible BIOS boot I/O procedures are used to manipulate the functions of extensible boot devices such as a USB hard disk.

Figure 6:
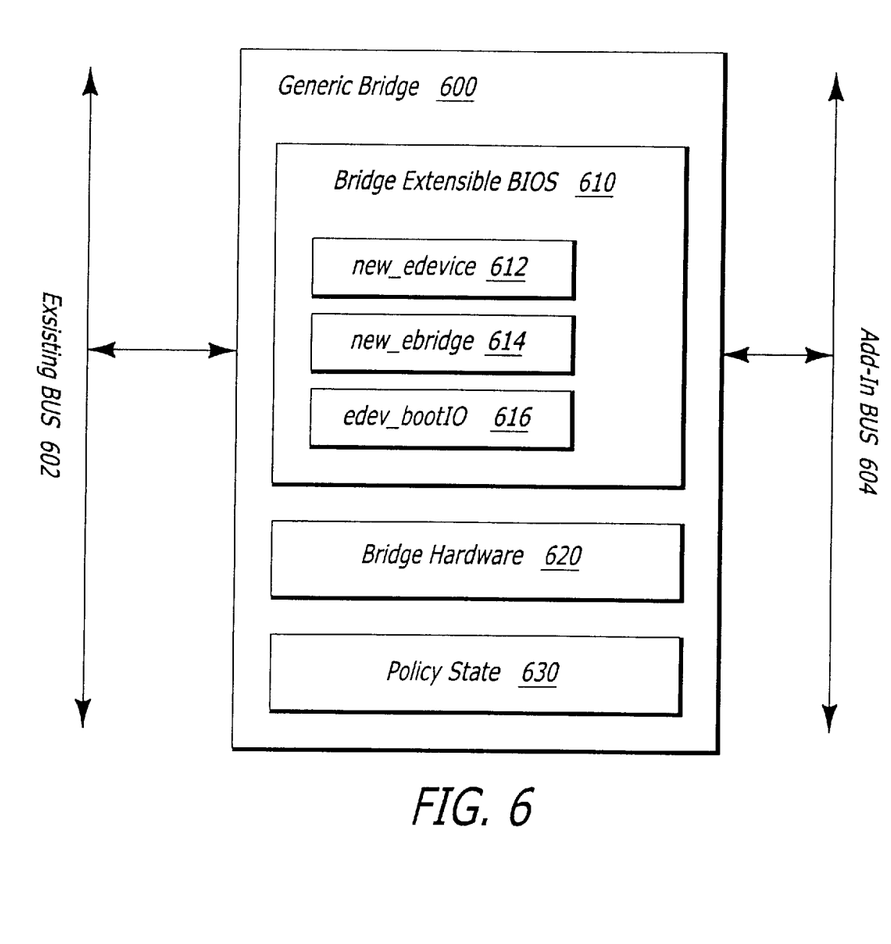
FIG. 6 shows the modules of a generic bridge block according to one embodiment the present invention.

A generic embodiment of an extensible BIOS is illustrated in FIG. 6. By adapting the description of the procedures new_ebridge 614, new_edevice 612, edev_bootIO 616 to a PCI bus specific implementation, a person of ordinary skill in the art can readily apprehend how new_ebridge 524, new_edevice 522 and edev_bootIO 526 would operate for a PCI bus. The pseudo code for these routines is shown in Appendix 2. The PCI extensible BIOS 521 of FIG. 5 is merely an example of a set of modules that can be included in the system BIOS ROM according to an embodiment of the present invention, and is not exhaustive. In both the generic and bus-specific examples, the 3 code modules—new_ebridge, new_edevice and edev_bootIO—are responsible for extensible BIOS operations. The modules new_ebridge 524 (FIG. 5) and new_ebridge 614 (FIG. 6) initialize a new extensible bridge device that can connect additional devices via the bridge. The modules new_edevice 522 and new_edevice 612 initialize a new extensible device and return information and parameters that are required to further use the new extensible device. The modules edev_bootIO 526 and edev_bootIO 616 provide a way to perform bus-specific and device-specific I/O operations relevant for boot-up. Although the procedures of PCI extensible BIOS 521 are illustrated in FIG. 5 as being included in the system BIOS, they may, in other embodiments, be carried within a PCI bridge device which connects two buses.

FIG. 6 shows the construction of a generic bridge device according to one embodiment of the present invention. The Bridge Hardware 620 contains the specific hardware required to connect the existing bus 602 to the add-in bus 604. The Bridge Extensible BIOS code 610 contains a bridge specific initialization module (new_ebridge 614), a bus specific boot device identification module (new_edevice 612), and bus specific boot device driver module (edev_bootIO 616). The system BIOS provides built-in support for a standard set of buses. The system BIOS will typically support PCI bus and ISA bus operable devices or bridges. The Southbridge initialization code 520 will detect any other extensible boot devices or bridges via its built in support. The PCI support within Southbridge initialization code 520 will be invoked if a PCI bridge is known to exist. That will cause the system BIOS to invoke the PCI ROM new_ebridge module 524. The module new_ebridge will recursively invoke any new_ebridge modules as they are discovered on newly detected bridges. The complete system bus topology will be recursively initialized as each discovered extensible bridge is initialized via its corresponding new_edevice module and new_ebridge module, as do new_edevice 612 and new_ebridge 614.

Appendix 2 shows that the module new_ebridge 614 initializes a new bridge and searches for new devices on that bridge. First, the bridge controller is initialized. Then the devices on the bridge are located. The detailed mechanisms used to locate devices on a bridge are very bridge-specific and may vary on the type and brand of bridge. Therefore, in this embodiment, it is assumed that a variable is used to advance through the locations that contain a device connected via the bridge. The variable next_device is assigned the first device location. If ROM is present for this device, then the ROM image is copied to main system memory. The copying of ROM to main memory is well-known in the art and will not be described further.

If the ROM is an extensible BIOS, then the new ROM's new_edevice module 612 is called with two parameters: the param_ptr that was passed to new_ebridge and the current value of next_device. The new_edevice module 612 returns as a result of its operating the entry address, type value and device_params data as described below.

If the "type" parameter returned indicates that the new device is a bridge, then the new_ebridge module of that new bridge in its ROM can be called to recursively initialize the new bridge and locate additional devices connected via the new bridge. The new_ebridge module 614 is called and sent two parameters: the bridge parameters for the new bridge device and an entry point for the system BIOS new_ebootdev module 536. The memory address for the new_ebootdev module 536 is known to the new_ebridge since it was passed to new_ebridge module 614 as a parameter.

If the "type" parameter returned indicates that the new device is not a bridge, but is instead a boot device, then the system BIOS new_ebootdev module 536 is invoked so that the system BIOS can determine whether it needs to use this new boot device for the current instance of boot-up.

Then, the next device on the current bridge is located and the next_device variable is assigned this new device location and the new_edevice modules are executed for this new device. When there are no further devices on the current bridge, the new_ebridge module 614 returns to its original caller, which will ultimately be the system BIOS module Std_bridge_init 534.

The new_edevice module 612 determines the device parameters for a new device connected through a bridge. Reffering to Appendix 2, the new_edevice module takes two parameters: bridgeparam_ptr and device_num. The bridgeparam_ptr is a pointer to a memory area containing parameters for the bridge that connects this new device. The device_num identifies the location for the new device on the connected bridge. This module is contained within the ROM of an extensible BIOS such as extensible BIOS 610. The new_edevice module 612 first initializes the new device to verify its presence in the system which it may do by using internal ROM routines or by using edev_bootIO module 616. If the device is present and operating correctly, then the type of the device, the entry point for its edev_bootIO module 616 and its device parameters are returned. Otherwise, an error code is returned.

Figure 7A:
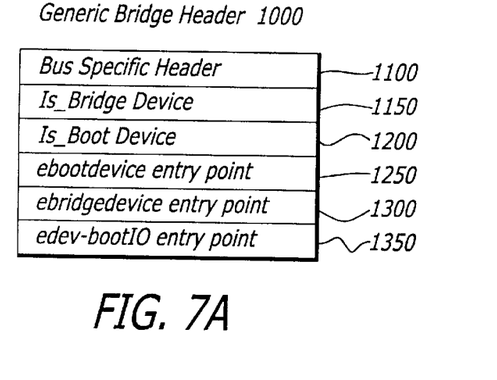
FIG. 7 shows partial PCI expansion ROM header and PCI data structure as can be utilized in various embodiments of the present invention.
Figure 7B:
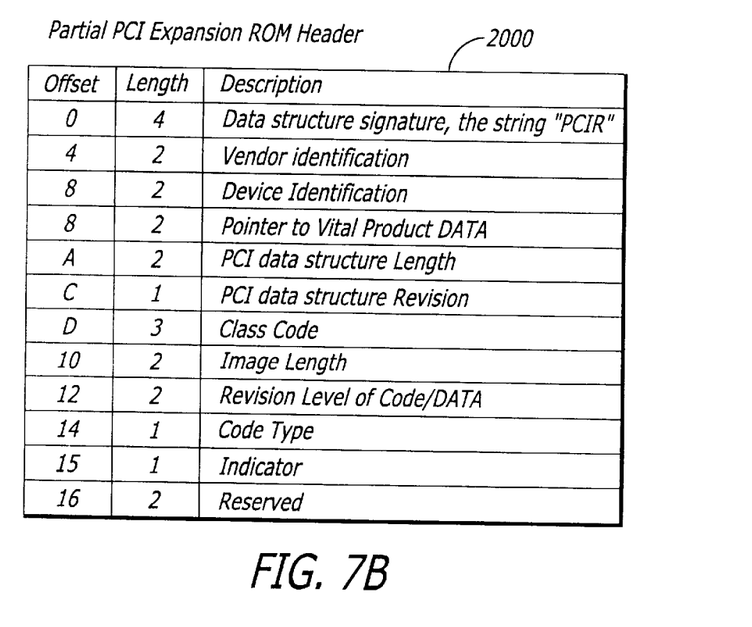
Figure 7C:
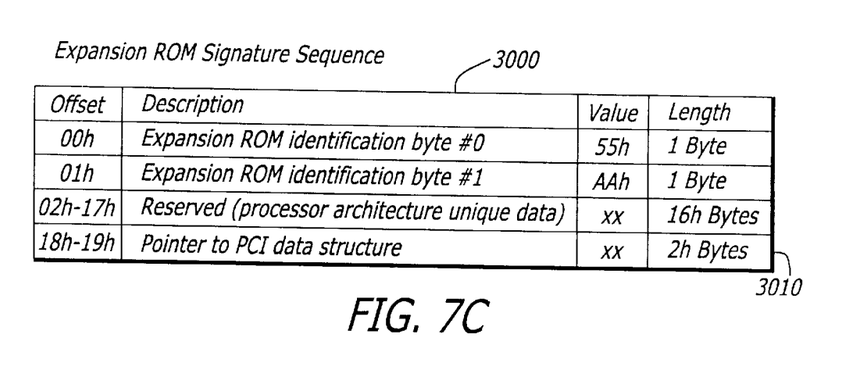

The entry address, "type" value and "device_params" return values can be determined in some appropriate bus specific fashion. Such a determination may be achieved, for example, by reading this information from a ROM bus specific header 1100 as shown in FIG. 7. For example, the Is_Bridge_Device 1150 and Is_Boot_Device 1200 fields can indicate if the device is respectively a bridge or boot device. Fields ebootdevice 1250, ebridge device 1300, edevbootIO 1350 contain the memory addresses for the entry points for code modules that support this new device.

Referring again to FIG. 6 and Appendix 2, the edev_bootIO module 616 takes two parameters: deviceparam_ptr and I/O request. The deviceparam_ptr is a pointer to a memory area containing paramters that identify this boot device. The I/O request parameter contains a value indicating a preferred I/O operation to be performed on this boot device. The edev_bootIO module 616 performs an I/O operation (identified by the I/O request) on the boot device (identified by deviceparam_ptr). The I/O operation is typically a read of information from the device or a write of information to the device as a part of performing a boot relevant function, such as reading the boot record of a hard disk.

Thus, using an extensible BIOS, virtually no limit is placed on the kind or numbers of buses from which a boot device can be identified. The system has a boot policy determined according to boot device selection and policy management code 539. This code can allow for the possibility of new boot devices that have dynamically appeared in the system by simple modification (e.g., a list presented to the user). The boot device selection and policy management code 539 is not the focus of the present invention and will not be discussed in detail. Once the system buses and bridges are recursively initialized, the selected boot devices will be used to boot-up the system via the system BIOS boot code 532. This boot code will use extensible BIOS edev_bootIO modules 616 for any extensible boot devices that have been selected to boot-up the system.

All of the mechanisms employed in the present invention are designed to recursively traverse through the entire topology of the system at boot-up. Thus, the bridge detection and initialization sequence may move from a parent bus/bridge to a first child device/bus/bridge and then to a bridge that is a child of that first child and so on. The boot device detection, driver detection and initialization code also can be employed to traverse recursively through the entire topology as is required. The extensible BIOS of the present invention can continue to make use of the current practice software interrupts for hard drive access (e.g. Int 19H) and the BIOS signature detection for the actual boot-up access once loading of the operating system from the boot device is completed after boot-up.

As shown on FIG. 5, the generic bridge embodiment can utilize a dynamic read/write memory space associated with the system BIOS such as NVRAM 599, to handle the boot policy state for example. Alternatively, the expansion bus bridges may be provided with flash, SRAM or other read/write storage 630, such that the BIOS is relieved of having to access a dynamic memory space directly for the policy management and storage of the stack/tree of bridges buses, and devices that may result from detection and initialization. Each interconnected bridge may also contain its own storage mechanism that contains the sub-topology and list of boot devices accessible from that bridge. The policy management may therefore be distributed to the bridges, while the code which performs the recursion may be in the system BIOS itself.

I/O definitions for floppy, harddisk, video are well established in the art for expansion BIOS. However, I/O definitions for keyboard and mouse are not established for expansion BIOS, but I/O operations for these input devices are defined in typical system BIOS.

Each type of bus defines its own specific way of carrying expansion BIOS code. For an example, refer to, "PCI Hardware and Software Architecture & Design" by Edward Solari and George Willse, Annabooks ISBN 0-929392-28-0 (March 1995, 3rd printing) [hereinafter "Solari reference"]. Techniques such as those shown in the Solari reference illustrate how the PCI ROM header can be used in carrying out certain operations of the extensible BIOS. Page 503 of the Solari reference shows that PCI devices indicate they carry expansion ROM code by reading back ROM-encoded size information at a memory and I/O address range offset of 30h in the PCI Device Header Type Region of the PCI Configuration Space Header for the PCI device. Within this ROM space, there can be one or more expansion ROM images that can be called by the system BIOS as described in chapter 20 of the Solari reference. The Solari reference (pp. 665–6) also describes how devices can be identified for the PCI bus via configuration space and headers. Other buses like Universal Serial Bus have equivalent methods to describe the presence of ROM code carried along with devices on the bus. Associated with these other buses there can also be descriptions of how standardized devices like keyboards, disks can be controlled and manipulated. These header definition techniques are well-known in the art.

All of the code modules and procedures described herein with regards to FIGS. 5 and 6 are executed via a CPU (Central Processing Unit) and memory similar to that shown in FIGS. 2 and 3. RAM or other system memory stores instructions generated by the code modules and stores data related to device and bridge parameters. These instructions are then executed by the CPU which writes certain results of the execution back to memory. The methods for executing code within a CPU, storing instructions and data within memory and the interaction between memories and CPUs is well-known in the art and will not be discussed further. Relevant to the embodiments of the invention is that system BIOS, extensible BIOS, bridge-specific BIOS, etc., are all capable of accessing memory and sending instructions and control signals to both CPU and memory. The code modules of the extensible BIOS are therefore computer-implemented methods.

FIG. 7 shows header formats of system components which may be utilized in the extensible BIOS. First, a generic device header 1000 is shown is shown as having a field 1100 specific to the bus on which it operates. Field 1100 contains data providing more information about the device in a bus specific manner and encoding and is not further described here. Generic device header 1000 also contains a flag 1150 identifying that the device is a bridge. Another flag 1200 identifies if the device is a boot device rather than a bridge. Three entry points can be carried in the device header. Field bootdevice 1250 contains the memory address for the entry point of the module new_edevice 612 of FIG. 6. Field ebridge 1300 contains the memory address for the entry point of the module new_ebridge 614 of FIG. 6. Field ebootIO 1350 contains the memory address for the entry point of the module edev_bootIO 616.

FIG. 7 also shows the typical PCI headers and a PCI data structure. In a PCI system or secondary PCI bus, a partial PCI expansion ROM header 2000 is carried on a PCI device. This header contains PCI specific information about the PCI device. It is an instantiation of the bus specific header 1100. This header 2000 is pointed to in memory by referring to field 3010 in an expansion ROM signature sequence 3000. Extensible BIOS provides an extension to the traditional practice of ROM headers and utilizes well-known ROM headers for specific buses and bridges for buses. Accordingly, a generic bridge header, for example, may be simply an extension of PCI expansion ROM header 2000.

Figure 8:
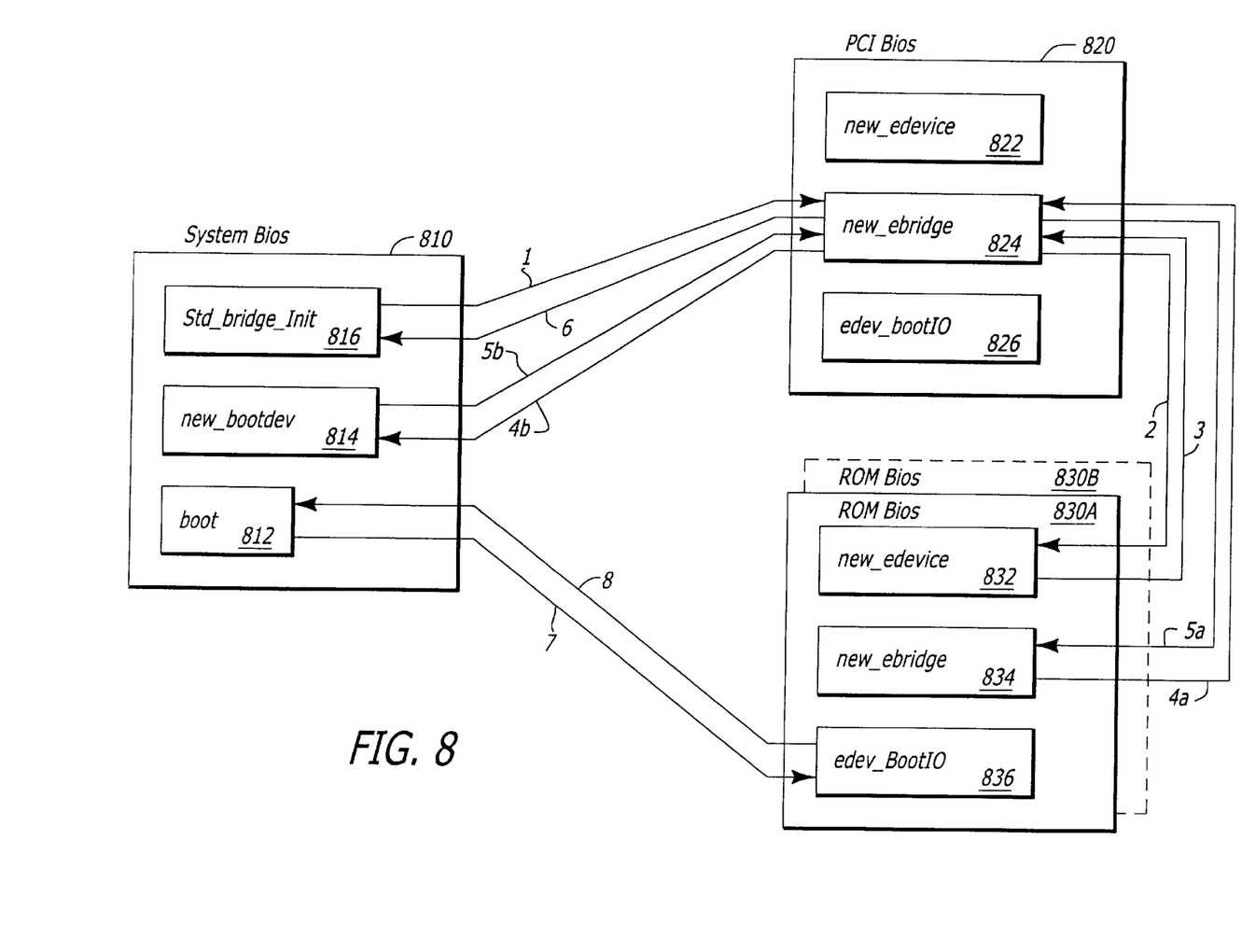
FIG. 8 shows the interrelationship of the code modules and describes the working of the invention according to the embodiment employed in Appendices 1 and 2.

FIG. 8 shows the interrelationship of the code modules and describes the working of the invention according to the embodiment employed in Appendices 1 and 2.

On a PCI-bus based system, many different busses can be connected using bridges (adapter cards) to which other buses or other bridges to other buses may be added. Though FIG. 8 illustrates a PCI bus specific embodiment, the extensible BIOS is not limited to PCI buses. Rather, the embodiment shown in FIG. 8 is a specific instance of the invention as applied to PCI and can readily be adapted to other bus types. Extensible BIOS can be adapted, for example, to work on a NuBus (product of Apple Computer Corporation) platform or SCSI bus platform by replacing the PCI specific information with NuBus or SCSI bus specific information as required.

When a bridge has been detected—and initially on a PCI based system, the system BIOS is pre-programmed to detect immediately the PCI bus and initialize it—system BIOS 810 calls for the CPU (not shown) to execute Std_bridge_init 816 to initialize the bridge controller (which in this example, is the PCI controller). Std_bridgeinit module 816 calls the new_ebridge 824 module of PCI BIOS 820 (arrow 1), to initialize the bridge and detect any PCI devices on the system bus. When new_ebridge 824 detects a PCI device with an extensible ROM BIOS A 830, it calls new_edevice 832 module of ROM BIOS A 830 (arrow 2) to identify what kind of device it is. The module new_edevice 832 returns information about that device (i.e., is it a bridge device, boot device, etc.) to PCI BIOS 820, and specifically to new_ebridge 824 (arrow 3).

If the device is identified as a bridge device according to the information returned, then new_ebridge module 824 (arrow 5a) calls a ROM BIOS module 830 B of the newly identified bridge device to in turn initialize any devices on that new bridge device. When all the devices on the newly identified bridge have been detected and initialized, new_ebridge 834 returns program flow control to new_ebridge 824 of PCI BIOS ROM 820 (arrow 4a).

If the device is identified not as a bridge device, but as some other device such as a hard disk, new_ebridge 824 calls the module new_ebootdev 814 of system BIOS 810 (arrow 4b) to store in the NVRAM or other memory boot information relevant to using the device as a potential boot-up device (to load an operating system or kernel). After storing the information regarding the boot characteristics, if any, of the device, program control returns to new_ebridge 824 (arrow 5b).

In either case, new_ebridge 824 of PCI BIOS *820* proceeds in this manner from one device to the next until all of them have been identified and initialized. Similarly, using new_ebridge 834, every new ROM BIOS 830 A, 830 B, and so on that may be detected can each call other new_ebridge modules to completely traverse and initialize the system bus topology terminating in the lowest layer of buses. In this manner, the bus topology can be "recursed" into and all boot relevant devices detected and initialized for the purpose of boot-up. When new_ebridge 824 has finished initializing completely the PCI bus, program flow control returns to Std_bridge_init 816 (arrow 6). This allows BIOS to complete POST processing which terminates in the actual loading of a kernel or operating system on a boot device. Module boot 812 performs the boot-up I/O operations with a boot device and may interact with a policy manager (not shown) which determines which devices detected as residing in the bus topology are to be booted and in which order. For a particular instance of boot-up, boot 812 calls an appropriate edev_boot_IO 836 boot device module (arrow 7) which performs the required I/O for boot-up and then returns to system BIOS 810 when complete (arrow 8). Thus, in every instance of boot-up, the precise bus and device topology need not be known; the extensible BIOS will detect and initialize any boot devices whichever and however they may reside.

Figure 9:
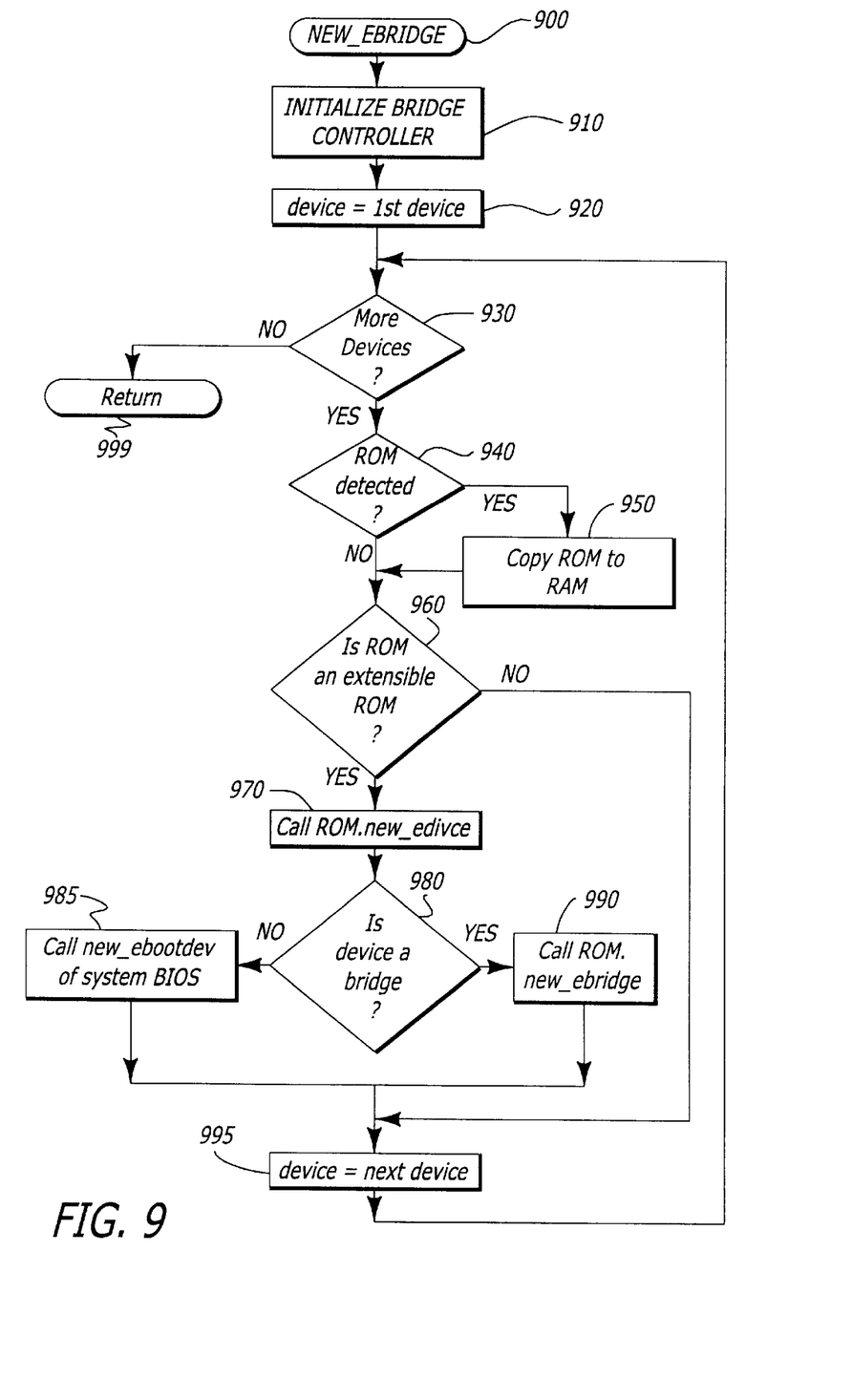
FIG. 9 is a flowchart of the recursion methodology of detecting and initializing devices through the system topology when starting with a particular bridge.

FIG. 9 is a flowchart of the recursion methodology of detecting and initializing devices through the system topology when starting with a particular bridge.

The module new_ebridge (step 900) is executed to first initialize the bridge controller on a bridge that has been discovered (step 910). According to step 920, the "device" variable is set to "first device" as a marker to indicate that the very first device in the topology is being detected. The variable "device" will later be incremented to mark each subsequent device which is detected and initialized (see step 995). At step 930, a check is performed to detect whether there are more devices. If not, then program control breaks out of device and bridge initialization modules and returns to its caller (step 999). If there are more devices, then at step 940, the presence of a ROM BIOS within or attached to that device is checked. If a ROM BIOS is present, then the ROM is copied to the system RAM according to step 950. Next, according to step 960, the presence of an extensible BIOS ROM is checked. If there is no extensible BIOS detected, then according to step 995, the "device" variable is set at the next device and the procedure repeats again with 930.

If there is an extensible ROM detected, then a call is made to the new_edevice module of that ROM (designated in step 970 as ROM.new_edevice). Next, according to step 980, the device type is checked to see whether the device detected is a bridge device. If not, then according to step 985, the new_ebootdev module of system BIOS (designated as SysBIOS.new_ebootdev) is executed to load and store relevant device specific information necessary or useful for using the device as a boot device. If, however, according to step 980 a bridge device is found, then the new_ebridge module of the device ROM (designated as ROM.new_ebridge) is called (step 990). In either case, the device variable is incremented to mark the "next device" and the process continues recursively through the entire bus/device topology (i.e. repetition of steps 930–995).

A call to the new_ebridge of the device ROM triggers steps identical to those of steps 900–980, and repeats until all bridges and devices connected to those bridges have been identified and initialized for the boot-up sequence. Once program control has detected the very last bridge and determined that no devices on that bridge are also bridge devices, the recursion into the topology is complete.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

---

APPENDIX 1

The following is a pseudo-code for additions required in an existing system
BIOS. In particular, three changes need to be made to an existing system
BIOS: 1) add new_ebootdev procedure that will be called by ebios code when a
new extension bios boot device is found, 2) (optionally) use ebios support
code for otherwise standard buses/bridges ala PCI, 3) use extension bios boot
I/O for new extension bios boot devices.

```
        System BIOS code includes:
        //Module (1)
        new_ebootdev(entry, type, pointer to device params):
        //entry parameter contains entry point memory address the new boot
            //device's I/O procedure. This procedure is used to perform any I/O
            //with the new boot device.
        //type parameter contains value indicating the type of the new boot
            //device, e.g., 1=hard disk, 2=floppy disk, 3=keyboard, 4=mouse,
            //5=network disk, 6=video display controller. . .
        //pointer to device params contains a memory address for a block of
            //memory filled with data specifically used for the new boot device.
            //This address is passed to the boot I/O entry point for each I/O
            //request. The data is used to allow the boot I/O procedure to
            //manipulate the boot device.
        //the type of the new boot device determines whether to use the
            //new boot device for this boot.
        If the boot device will be used, save the entry point and device
        parameters for use during boot I/O requests.
        //Module (2)
        standard_bridge_init:
        //modify existing BIOS code to initialize a standard bridge (ala PCI):
            //instead of using internal BIOS monolithic code, call the ebios
            //for PCI that may be conveniently included in the system BIOS
```

APPENDIX 1

```
PCI_Bios new_ebridge(pointer to standard bridge params, pointer to
new_ebootdev)
//where:
    //first parameter is a memory address of data for the existing PCI bus
    //second parameter is memory address of data for new bridge
//Module (3)
//modification of normal BIOS boot process to handle extension BIOS boot
//devices
if eboot device then
    retrieve eboot_device save I/O entry point
    call (eboot IO entry) (pointer to params, IOrequest)
//where pointer to params is memory address saved in new_ebootdev above
    //IOrequest contains data specifying details of boot device IO
    //operation requested
```

What is claimed is:

1. A computer system having a system BIOS, a CPU, a first bus, an add-in bus and an extended bridge coupling said add-in bus and said first bus, an apparatus for extending boot support to devices connected to said add-in bus, said apparatus comprising:

an extensible BIOS support coupled to said system BIOS; and a bus-specific extensible BIOS coupled to said system BIOS, wherein said bus-specific extensible BIOS carries specifications unique to said add-in bus enabling said system BIOS and said extensible BIOS support to identify and initialize boot devices coupled to said add-in bus, said boot devices not requiring modification to support said extensible BIOS support.

2. In a computer system having a system BIOS, a CPU, a first bus, an add-in bus and extended bridge coupling said add-in bus and said first bus, an apparatus for extending boot support to devices connected to said add-in bus, said apparatus comprising:

an extensible BIOS support coupled to said system BIOS; and a bridge extensible BIOS coupled to said extended bridge and carrying code for said system BIOS, said code including modules to be executed by said CPU, wherein said code carries specifications unique to said extended bridge enabling said system BIOS and said extensible BIOS support to identify and initialize devices coupled to said add-in bus, said devices not requiring modification to support said extensible BIOS support.

3. The computer system of claim 2 wherein said modules include a bridge initialization module coupled by execution of said code to said extended bridge to identify and initialize devices on said add-in bus that are bridges.

4. The computer system of claim 2 wherein said modules include a device identification module executed by said CPU to identify and initialize devices on said add-in bus that are designated as boot-up devices.

5. The computer system of claim 3 wherein said initialization module invokes said code to identify and initialize devices connected through said bridges other than said extended bridge that are designated as boot devices.

6. In a computer system having a system BIOS and a plurality of buses, at least one of said buses for connecting to at least one device, a method of extending boot-up capability to devices connected to said at least one bus comprising the steps of:

initializing bridges that connect a first one of said buses with a second one of said buses; and initializing devices connected to said second one of said buses bus that are boot devices for boot-up of said computer system, said boot devices not requiring modification for carrying out said initializing of devices.

7. The method of extending boot capability according to claim 6 wherein initializing said bridge comprises the step of identifying that a device coupled to said first bus is a bridge.

8. The method of extending boot capability according to claim 6 wherein the step of initializing devices comprises the steps of:

identifying that a device coupled to said second one of said buses is a boot device;

detecting drivers and device information coupled to said boot device; and initializing said drivers on said boot devices enabling said system BIOS to commence boot-up of said boot device using said drivers.

9. The method of extending boot capability according to claim 7 wherein said first bus is of an architecture type dissimilar to said second bus.

10. The method of extending boot capability according to claim 7 wherein any of said devices and said buses are coupled in a first instance of boot-up and de-coupled in a another instance of boot-up.

11. A method of extending boot capability according to claim 8 further comprising the steps of:

identifying that an extensible ROM is present in said boot device; and copying to a system memory the contents of said extensible ROM.

12. A method of extending boot capability according to claim 6 wherein the steps of initializing bridges is recursively performed to identify each and every bridge.

13. In a computer system having a system BIOS and a plurality of buses, said system BIOS and buses coupled to said computer system, an extensible BIOS comprising:

a system extensible BIOS support module coupled to said system BIOS; and an extensible BIOS module coupled to said system extensible BIOS support module and said system BIOS, wherein said BIOS module and BIOS support module are coupled to identify and initialize any devices connected to said buses which are boot devices, said boot devices not requiring modification to support said extensible BIOS module.

14. An extensible BIOS according to claim 11 wherein said system extensible BIOS support module comprises:

a new boot device identifier coupled to said buses to detect and initialize said boot devices;

a standard bridge initializer coupled to said buses to initialize some of said buses; and an extensible BIOS boot-up module coupled to said boot devices to replace ordinary system BIOS boot-up and boot-up said computer system according to extensible BIOS boot-up procedures.

15. An extensible BIOS according to claim 11 wherein said extensible BIOS module further comprises:

a new device identifier coupled to said buses to detect and initialize add-in devices;

a bridge identifier coupled to said buses to detect and initialize said bridges; and a boot device driver coupled to said new devices to enable boot-up of said computer system from said new devices.

* * * * *

UNITED STATES PATENT AND TRADEMARK OFFICE
CERTIFICATE OF CORRECTION

PATENT NO. : 5,854,905
DATED : December 29, 1998
INVENTOR(S) : Garney

It is certified that error appears in the above-identified patent and that said Letters Patent is hereby corrected as shown below:

In column 16, at line 66, delete "claim 11" and insert --claim 13--.
In column 17, at line 9, delete "claim 11" and insert --claim 14--.

Signed and Sealed this

Twelfth Day of December, 2000

*Attest:*

Q. TODD DICKINSON

*Attesting Officer*      *Director of Patents and Trademarks*